(12) United States Patent
Kim et al.

(10) Patent No.: US 12,348,407 B2
(45) Date of Patent: Jul. 1, 2025

(54) APPARATUS AND METHOD FOR CENTRALIZED ULTRA-PRECISION NETWORK CONTROL FRAMEWORK CONTROLLING HETEROGENEOUS MULTIPLE NETWORK DOMAINS IN COMMUNICATION SYSTEM

(71) Applicant: ELECTRONICS AND TELECOMMUNICATIONS RESEARCH INSTITUTE, Daejeon (KR)

(72) Inventors: Eung Ha Kim, Daejeon (KR); Yeoncheol Ryoo, Daejeon (KR); Bin Yeong Yoon, Daejeon (KR); Taesik Cheung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 80 days.

(21) Appl. No.: 18/228,132

(22) Filed: Jul. 31, 2023

(65) Prior Publication Data

US 2024/0235983 A1 Jul. 11, 2024

(30) Foreign Application Priority Data

Jan. 9, 2023 (KR) ........................ 10-2023-0002707

(51) Int. Cl.
*G06F 15/173* (2006.01)
*H04L 45/02* (2022.01)
(Continued)

(52) U.S. Cl.
CPC ............ *H04L 45/123* (2013.01); *H04L 45/02* (2013.01); *H04L 47/762* (2013.01)

(58) Field of Classification Search
CPC ...... H04L 45/123; H04L 45/02; H04L 47/762
(Continued)

(56) References Cited

U.S. PATENT DOCUMENTS

2010/0208722 A1\* 8/2010 Nishioka ................. H04L 45/04
370/351
2012/0166658 A1 6/2012 Kim et al.
(Continued)

OTHER PUBLICATIONS

T.K. Kang et.al., "Research Trend in Ultra-Low Latency Networking for Fourth Industrial Revolution", Electronics and Telecommunications Trends, vol. 34, No. 6, Dec. 2019.

*Primary Examiner* — Imad Hussain
(74) *Attorney, Agent, or Firm* — LRK PATENT LAW FIRM

(57) ABSTRACT

Provided is an apparatus and method for a centralized ultra-precision network control framework controlling heterogeneous multiple network domains to provide a large-scale end-to-end ultra-precision service in a communication system. A method of operating a network domain controller in a communication system includes: receiving node information, link information, adjacent node information, and adjacent node link information from a network node control agent; identifying controller topology information based on the node information, the link information, the adjacent node information, and the adjacent node link information; and transmitting boundary node information, boundary node link information, adjacent domain node information, and adjacent domain node link information to a network orchestrator.

19 Claims, 10 Drawing Sheets

(51) Int. Cl.
*H04L 45/12* (2022.01)
*H04L 47/762* (2022.01)

(58) Field of Classification Search
USPC .......................................................... 709/238
See application file for complete search history.

(56) References Cited

U.S. PATENT DOCUMENTS

2016/0191194 A1* 6/2016 Wood .................. H04J 14/0267
                                                            398/58
2017/0104847 A1* 4/2017 Zhang ..................... H04L 67/63
2017/0331727 A1 11/2017 Ryoo et al.
2019/0174322 A1* 6/2019 Deviprasad ......... H04L 41/0853
2023/0261736 A1* 8/2023 Torres ..................... H04L 45/42
                                                            370/316

* cited by examiner

# APPARATUS AND METHOD FOR CENTRALIZED ULTRA-PRECISION NETWORK CONTROL FRAMEWORK CONTROLLING HETEROGENEOUS MULTIPLE NETWORK DOMAINS IN COMMUNICATION SYSTEM

CROSS-REFERENCE TO RELATED APPLICATION

This application claims priority to and the benefit of Korean Patent Application No. 10-2023-0002707, filed in the Korean Intellectual Property Office on Jan. 9, 2023, the entire contents of which are incorporated herein by reference.

BACKGROUND

1. Field of the Invention

The present disclosure relates to a communication system, and more specifically to an apparatus and method for a centralized ultra-precision network control framework controlling heterogeneous multiple network domains to provide a large-scale end-to-end ultra-precision service in a communication system.

2. Description of Related Art

In order to provide a large-scale end-to-end ultra-precision service across a long distance, a time-deterministic service, such as a deterministic networking (DetNet) service, needs to be supported in network infrastructure. However, the current DetNet services may be provided on small network and single network domains, such as a campus network and a private wide area network (WAN). In order to construct a large-scale deterministic network, it is required to be composed of multiple network domains, and in order that each single network domain constituting the multiple network domains provides a time deterministic service, the single network domain needs to be a network domain supporting a DetNet service. In addition, in providing a DetNet service, each of the single network domains constituting the multiple network domains may be a network domain composed of only DetNet network nodes or may be a network domain composed of a DetNet network node and an optical transport network (OTN) node. Therefore, the network domain may be classified into a network domain of a homogeneous layer composed of only DetNet network nodes and a network domain of a heterogeneous layer composed of DetNet network nodes and OTN network nodes. As described above, a combination of a homogeneous layer network domain and a heterogeneous layer network domain may be defined as heterogeneous multiple domains.

SUMMARY OF THE INVENTION

Based on the above discussion, the present disclosure provides an apparatus and method for a centralized ultra-precision network control framework controlling heterogeneous multiple network domains to provide a large-scale end-to-end ultra-precision service in a communication system.

In addition, the present disclosure provides an apparatus and method for a centralized ultra-precision network control framework system providing a DetNet-based ultra-precision service in a large-scale deterministic network composed of heterogeneous multiple network domains in a communication system.

The technical objectives of the present invention are not limited to the above, and other objectives may become apparent to those of ordinary skill in the art based on the following descriptions.

According to various embodiments of the present invention, there is provided a method of operating a network domain controller in a communication system, the method including: receiving node information, link information, adjacent node information, and adjacent node link information from a network node control agent; identifying controller topology information based on the node information, the link information, the adjacent node information, and the adjacent node link information; and transmitting boundary node information, boundary node link information, adjacent domain node information, and adjacent domain node link information to a network orchestrator.

According to various embodiments of the present invention, there is provided a method of operating a network orchestrator in a communication system, the method including: receiving boundary node information, boundary node link information, adjacent domain node information, and adjacent domain node link information from a network domain controller; and generating orchestrator topology information based on the boundary node information, the boundary node link information, the adjacent domain node information, and the adjacent domain node link information.

According to various embodiments of the present invention, there is provided a network domain controller in a communication system, the network domain controller including: a transceiver; and a controller operatively connected to the transceiver, wherein the controller is configured to: receive node information, link information, adjacent node information, and adjacent node link information from a network node control agent; identify controller topology information based on the node information, the link information, the adjacent node information, and the adjacent node link information; and transmit boundary node information, boundary node link information, adjacent domain node information, and adjacent domain node link information to a network orchestrator.

According to various embodiments of the present invention, there is provided a network orchestrator in a communication system, the network orchestrator including: a transceiver; and a controller operatively connected to the transceiver, wherein the controller is configured to: receive boundary node information, boundary node link information, adjacent domain node information, and adjacent domain node link information from a network domain controller; and generate orchestrator topology information based on the boundary node information, the boundary node link information, the adjacent domain node information, and the adjacent domain node link information.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1A:
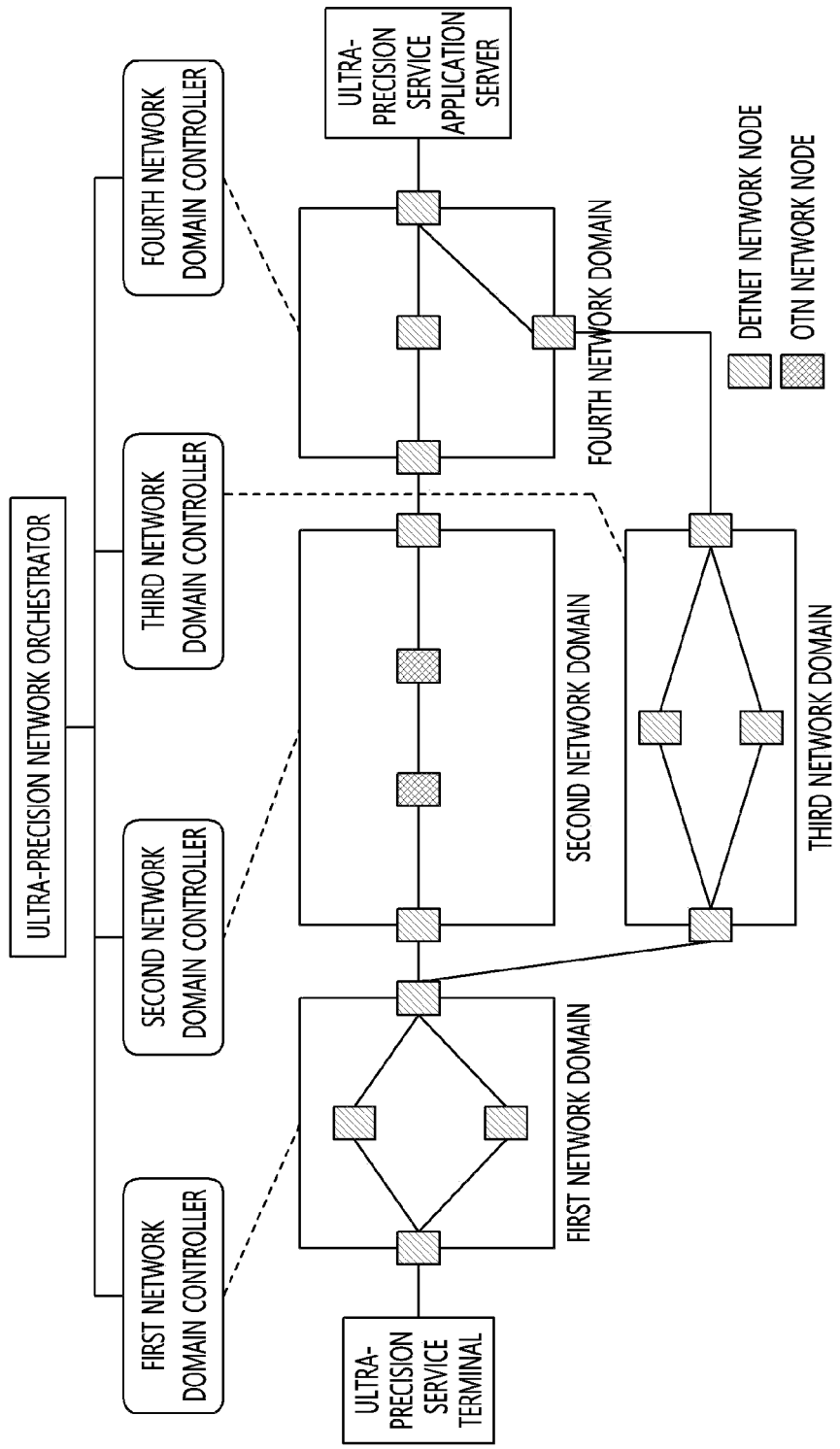
FIGS. 1A and 1B illustrate an example of a structure of a centralized ultra-precision network control framework controlling heterogeneous multiple network domains to provide an ultra-precision service in a large-scale deterministic network according to various embodiments of the present disclosure.

Terms used herein are used for describing particular embodiments and are not intended to limit the scope and spirit of the present invention. It should be understood that the singular forms "a" and "an" also include the plural forms unless the context clearly dictates otherwise. Terms (including technical and scientific terms) used herein have the same meaning as commonly understood by those of ordinary skill in the art to which this invention belongs. It will be further understood that terms, such as those defined in commonly used dictionaries, should be interpreted as having a meaning that is identical or similar to their meaning in the context of the relevant art and will not be interpreted in an idealized or overly formal sense unless expressly so defined herein. In some cases, even terms defined in the present disclosure cannot be construed to exclude embodiments of the present disclosure.

In various embodiments of the present disclosure described below, a hardware approach is illustrated by way of example. However, since the various embodiments of the present disclosure include technology using both hardware and software, the various embodiments of the disclosure do not exclude a software-based approach.

In the following description, the present disclosure relates to an apparatus and method for a centralized ultra-precision network control framework controlling heterogeneous multiple network domains to provide a large-scale end-to-end ultra-precision service in a communication system. Specifically, the present disclosure describes a technology of providing a centralized ultra-precision network control framework controlling heterogeneous multiple network domains constituting a large-scale deterministic network.

In the following description, terms referring to signals, terms referring to channels, terms referring to control information, terms referring to network entities, terms referring to components of a device, and the like are used for illustrative purposes only for the sake of convenience of description. Accordingly, the present disclosure is not limited to the terms described below, and other terms having equivalent technical meanings may be used.

In addition, although the present disclosure describes various embodiments using terms used in some communication standards (e.g., Internet Engineering Task Force (IETF)), this is only an example for description. Various embodiments of the present disclosure may be easily modified and applied to other communication systems.

In order to provide a large-scale end-to-end ultra-precision service across a long distance, a time-deterministic service, such as a deterministic networking (DetNet) service needs to be supported in network infrastructure. However, the current DetNet services may be provided on small network and single network domains, such as a campus network and a private wide area network (WAN). In order to construct a large-scale deterministic network, it is required to be composed of multiple network domains, and in order that each single network domain constituting the multiple network domains provides a time deterministic service, the single network domain needs to be a network domain supporting a DetNet service. In addition, in providing a DetNet service, each of the single network domains constituting the multiple network domains may be a network domain composed of only DetNet network nodes or may be a network domain composed of a DetNet network node and an optical transport network (OTN) node. Therefore, the network domain may be classified into a network domain of a homogeneous layer composed of only DetNet network nodes and a network domain of a heterogeneous layer composed of DetNet network nodes and OTN network nodes. As described above, a combination of a homogeneous layer network domain and a heterogeneous layer network domain may be defined as heterogeneous multiple domains.

A network domain controller that manages a network domain of a homogeneous layer and a network domain controller that manages a network domain of a heterogeneous layer may be separately present.

Therefore, in order to provide deterministic networking (DetNet)-based ultra-precision services in a large-scale deterministic network composed of heterogeneous multiple network domains, there is a need for a centralized ultra-precision network control framework system as a new network domain control method.

As a solution to the issue of the background technology, the present disclosure aims to, when considering that an ultra-precision service requiring time-deterministic communication without distance limitations, such as in large-scale smart factories or residential games using extended reality (XR), will emerge as a key business model service on 6G, enable network infrastructure to provide such an ultra-prevision service by providing a centralized ultra-precision network control framework system capable of providing a DetNet-based ultra-precision service in a large-scale deterministic network composed of heterogeneous multiple network domains.

In order to achieve the above object, the present disclosure may provide a centralized ultra-precision network control framework system for supporting the provision of a DetNet-based ultra-precision service in a large-scale deterministic network by including an ultra-precision network orchestrator, a network domain controller, and a control agent of network nodes within a network domain.

The ultra-precision network orchestrator may configure network domain topology information, set a network domain route, and according to an ultra-precision service start request being received from a terminal, request provision of a time deterministic ultra-precision service from the network domain controller that constitutes heterogeneous multiple network domains. To this end, the ultra-precision network orchestrator may include an orchestrator topology information configuration function, an orchestrator route setting function, and an orchestrator service control function.

The network domain controller may configure network node topology information, and upon receiving a request for provision of an ultra-precision service from the ultra-precision network orchestrator, set a route for network nodes, secure bandwidth resources for the ultra-precision service, identify a delay time of the network nodes set as a route, and calculate a packet delivery time suitable for an in-time service or an on-time service, which are types of ultra-precision services.

In addition, the network domain controller may transmit, to each of the network nodes belonging to the corresponding network domain, the set route information, the secured bandwidth resource information, and the calculated packet delivery time information such that the time-deterministic ultra-precision services are provided to all of the network nodes.

To this end, the network domain controller may include a controller topology information configuration function, a controller route setting function, a controller resource management function, a controller delay management function, a controller ultra-precision service packet delivery time processing function, and a controller service control function.

The network node control agent may include a function of providing the network node and link information requested by the network domain controller, and setting ultra-precision service packet delivery information by processing route information for ultra-precision service delivery, bandwidth resource information for ultra-precision service, and ultra-precision service packet delivery time information received from the network domain controller in each network node.

In addition, the network node control agent may transmit an ultra-precision service packet received by the network node to a lower network node connected to the network node using the ultra-precision service packet delivery information configured as described above.

Figure 1B:
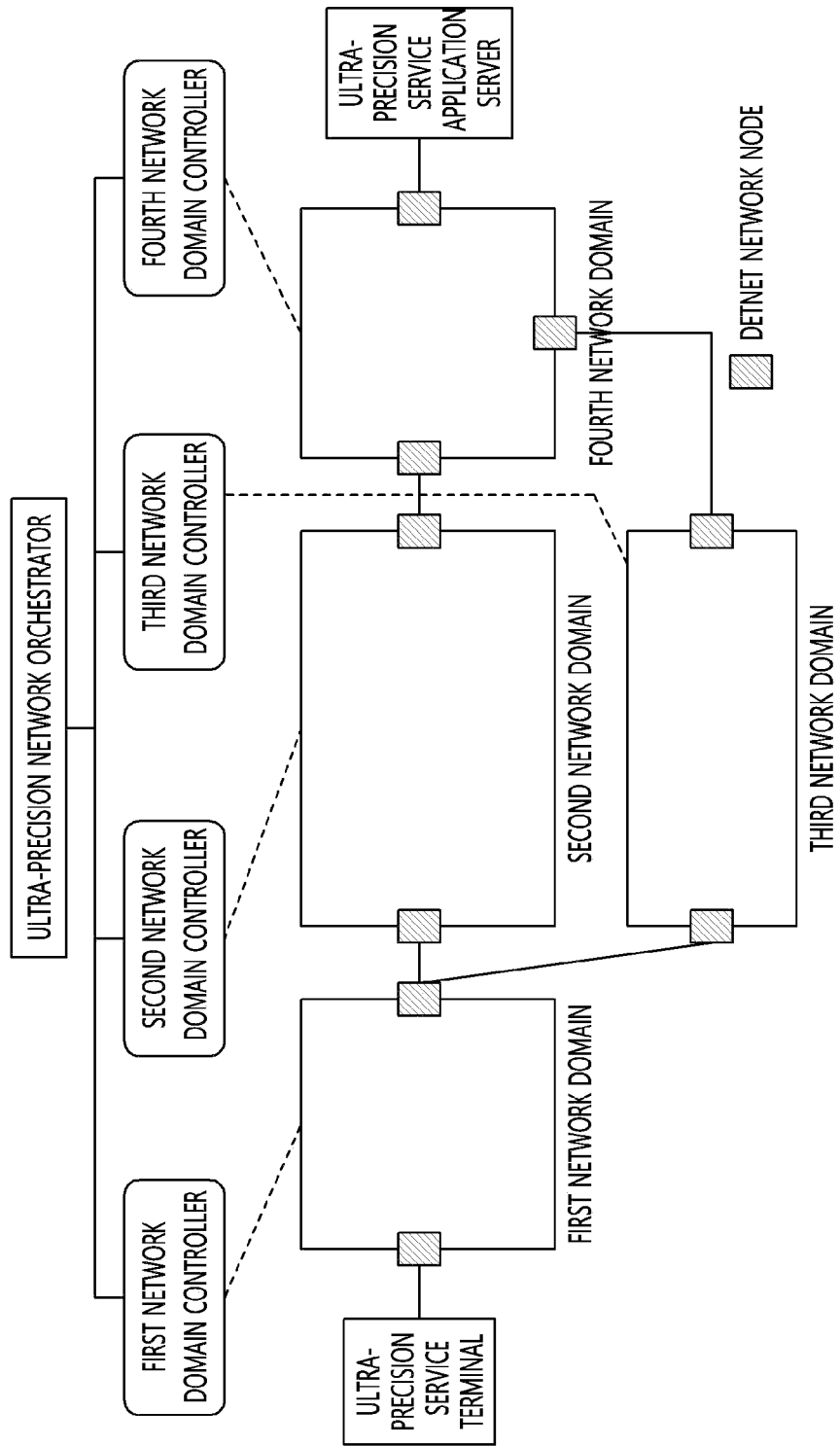

FIGS. 1A and 1B illustrate an example of a structure of a centralized ultra-precision network control framework controlling heterogeneous multiple network domains to provide an ultra-precision service in a large-scale deterministic network according to various embodiments of the present disclosure.

Referring to FIG. 1A, a homogeneous layer network domain and a heterogeneous layer network domain may be configured as a large-scale deterministic network by connecting network domains with network nodes capable of supporting DetNet services.

A network domain controller may provide a network node topology view as shown in FIG. 1A such that all network nodes within a corresponding network domain may be viewed and controlled.

On the other hand, referring to FIG. 1B, an ultra-precision network orchestrator may provide a network topology view which is abstracted such that only network nodes located at a boundary of a network domain are viewed as shown in FIG. 1B, rather than all network nodes within a network domain are viewed like the network domain controller. This could mean that the ultra-precision network orchestrator recognizes a topology of domains and the nature of connections between domains, but does not recognize content within the network domain. This is to prevent the sharing of information about the content within a network domain for scalability and confidentiality.

In addition, the network domain controller may not recognize internal topologies of other network domains. Therefore, the connection between network domains is recognized only by the ultra-precision network orchestrator, and the network domain controller may recognize only the connection of network nodes within the corresponding network domain controlled by the network domain controller.

Therefore, the ultra-precision network orchestrator may, when setting a route for delivering a ultra-precision service packet upon receipt of a request for provision of an ultra-precision service from a terminal, request the connection between network nodes in each of the network domains from the network domain controllers because the ultra-precision network orchestrator recognizes only the connection between network domains. The network domain controller may, according to a request for connection of network nodes within a network domain from the ultra-precision network orchestrator, perform connection on network nodes within the network domain controlled by the network domain controller. By the network nodes in each network domain connected as described above, an ultra-precision service packet is delivered through a large-scale deterministic network, and thus a long-distance end-to-end ultra-precision services are provided.

According to an embodiment, the ultra-precision network orchestrator, the network domain controller, and the control agent of network nodes within a network domain may be connected in a wired manner.

Figure 2:
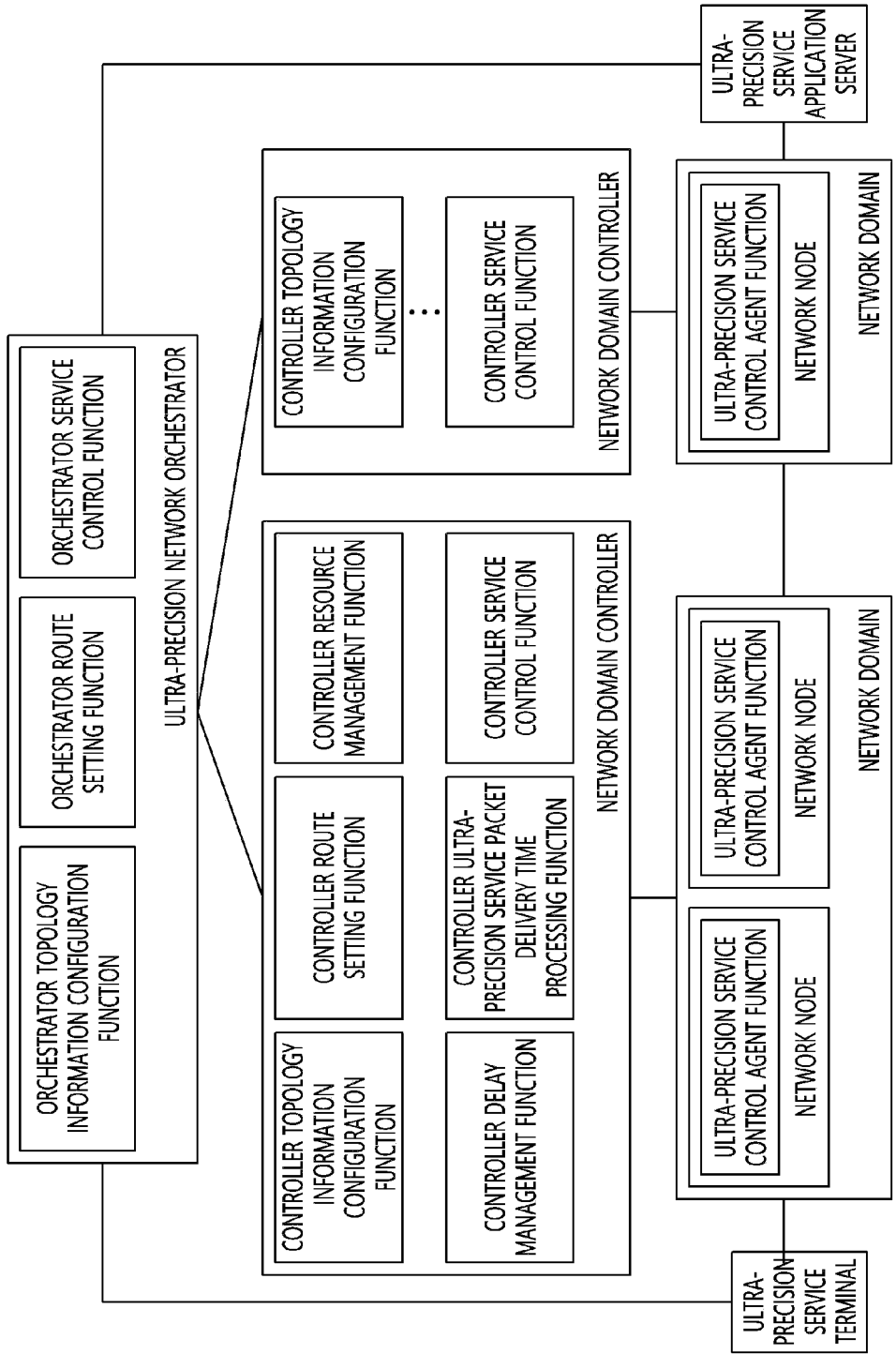
FIG. 2 illustrates an example of a structure of a centralized ultra-precision network control framework system controlling heterogeneous multiple network domains according to various embodiments of the present disclosure.

FIG. 2 illustrates an example of a structure of a centralized ultra-precision network control framework system controlling heterogeneous multiple network domains according to various embodiments of the present disclosure.

Referring to FIG. 2, a centralized ultra-precision network control framework system for controlling heterogeneous multiple network domains may include an ultra-precision network orchestrator, a network domain controller, and a network node control agent as shown in FIG. 2.

The ultra-precision network orchestrator may include an orchestrator topology information configuration function, an orchestrator route setting function, and an orchestrator service control function, to configure network domain topology information, set a network domain route, and according to an ultra-precision service start request being received from a terminal, request a time deterministic ultra-precision service from heterogeneous multiple network domains.

The network domain controller configures network node topology information, and upon receiving a request for provision of an ultra-precision service from the ultra-precision network orchestrator, sets a route for network nodes, secures bandwidth resources for the ultra-precision service, identifies a delay time of the network nodes set as the route, and calculates a packet delivery time suitable for an in-time service or an on-time service, which is a type of ultra-precision services. In addition, the network domain controller transmits, to each of the network nodes belonging to the corresponding network domain, the set route information, the secured bandwidth resource information, and the calculated packet delivery time information such that time-deterministic ultra-precision services are provided to all of the network nodes. To perform the functions, the network domain controller may include a controller topology information configuration function, a controller route setting function, a controller resource management function, a controller delay management function, a controller ultra-precision service packet delivery time processing function, and a controller service control function.

The network node control agent may include a function of providing the network node and link information requested by the network domain controller, and setting ultra-precision service packet delivery information by processing route information for ultra-precision service delivery, bandwidth resource information for ultra-precision service, and ultra-precision service packet delivery time information received from the network domain controller in each network node.

In addition, the network node control agent may transmit an ultra-precision service packet received by the network node to a lower network node connected to the network node using the ultra-precision service packet delivery information configured as described above.

The orchestrator topology information configuration function collects node and link information of nodes located on the boundary of each network domain received from the network domain controllers to configure network domain topology information. The orchestrator topology information configured by the orchestrator topology information configuration function includes a domain identifier, a boundary node identifier, a link identifier of a boundary node, a port number of a boundary node, an adjacent domain identifier, an adjacent domain boundary node identifier, a link identifier of an adjacent domain boundary node, a port number of an adjacent domain boundary node, and an inter-domain connection interface method (a user to network interface (UNI), and a network to network interface (NNI)).

The orchestrator route setting function configures route information of each domain using the network domain topology information to set a network domain route for the requested ultra-precision service. The orchestrator route setting function selects all possible candidate network domain routes that are targets of the network domain route, requests each of the network domain controllers for a node route for one of the candidate network domain routes, and when all of the network domain controllers successfully set node routes, finally sets the corresponding candidate network domain route. However, when even one network domain controller does not succeed in setting the node route, the orchestrator route setting function requests each of the network domain controllers to set a node route for the next candidate network domain route in a repeated manner to perform such a candidate network domain route process until all of the network domain controllers successfully set node routes, and the candidate network domain route is finally set.

The orchestrator service control function may, in order to identify whether provision of an ultra-precision service requested by a terminal is possible, request the controller service control function of each network domain controller constituting the heterogeneous multiple network domains to provide domain route information set for providing the ultra-precision service, bandwidth resource information required for the ultra-precision service, and the maximum delay time of the domain route in advance.

In addition, the orchestrator service control function may, upon receiving a response from the controller service control functions of all of the network domain controllers that the provision of the ultra-precision service is possible, transmit an actual ultra-precision service provision request including the set domain route information, the bandwidth resource information for the ultra-precision service, and the ultra-precision service delivery time information to the controller service control function of each of the network domain controllers.

The controller topology information configuration function may collect node and link information transmitted from all control agents of network nodes constituting the network domain to configure topology information of all of the network nodes managed by the network domain controller.

The controller topology information configured by the controller topology information configuration function includes a node identifier of a node, an attribute of the node, a link identifier of the node, a port number of the node, an ingress adjacent domain identifier of the node, an ingress adjacent domain node identifier of the node, a link identifier of the ingress adjacent domain node of the node, a port number of the ingress adjacent domain node of the node, an egress adjacent domain identifier of the node, an egress adjacent domain node identifier of the node, a link identifier of the egress adjacent domain node of the node, and a port number of the egress adjacent domain node of the node. Here, the attribute of the node is classified into an ingress node, an egress node, and a transit node. The ingress node is a node at the boundary of a domain, in which an ultra-precision service packet enters the boundary of the domain, the egress node is a node at the boundary of a domain, in which an ultra-precision service packet exits the boundary of the domain, and the transit node is a node located within a domain in which an ultra-precision service packet is transmitted from one node to another node in the domain.

Therefore, only when the attribute of a node is an ingress node or an egress node, may the information be provided as the orchestrator topology information.

The controller route setting function may, based on domain route information set for providing the ultra-precision service requested by the controller service control function, set a route of network nodes using an ingress node and an egress node of a domain as a reference axis for the ultra-precision service packet to enter and exit the domain. That is, the set domain route information is one of the pieces of candidate domain route information selected through the orchestrator route setting function, and the controller route setting function may search for a node route including an ingress node and an egress node, which are boundary nodes of the domain, to set a node route in the corresponding domain.

The controller resource management function is a function that identifies whether bandwidth resources for the ultra-precision service requested by the controller service control function are available and secures the bandwidth resources. The controller resource management function may check whether a bandwidth on the node route set through the controller route setting function is available and, when the bandwidth is available, the controller resource management function may allocate the corresponding bandwidth.

The controller delay management function is a function that identifies the maximum delay time of the network domain requested by the controller service control function, and in order to calculate the maximum delay time on the node route set through the controller route setting function, may identify and calculate the node maximum delay time and the link maximum delay time.

The controller ultra-precision service packet delivery time processing function may identify whether the ultra-precision service requested by the controller service control function is an in-time service or an on-time service, and in the case of an in-time service, calculate an in-time packet delivery time for processing an in-time packet of a network node, which includes a local delay time of the network node and an in-time allowable delay time, and in the case of an on-time service, calculate an on-time packet delivery time for processing an on-time packet of a network node, which includes a local delay time of the network node, a buffering delay time for which the packet is forced to stay before being transmitted to the next network node, and an allowable variation in delay time of on-time packet delivery.

The in-time packet delivery method is a method in which a packet is delivered as rapidly as possible by ensuring the delivery of packets within maximum delay time requirements of the ultra-precision service, and the on-time packet delivery method is a method in which a packet needs to be delivered at a desired point in time by ensuring the delivery of packets within delay time variation (jitter) requirements of the ultra-precision service.

The controller service control function may, upon receiving the request for the set domain route information, the bandwidth resource information required for the ultra-precision service, and the maximum delay time of the domain route, which is requested in advance for the orchestrator service control function to identify whether provision of the ultra-precision service is possible, request the controller route setting function for route setting of network nodes based on the set domain route information, make a request to the controller resource management function as to whether bandwidth resources for the requested ultra-precision service are available, and request the controller delay management function for the maximum delay time of the corresponding network domain, and may transmit the set node route information, the bandwidth resource information, and the maximum delay time information received as a response from each function to the orchestrator service control function.

The orchestrator service control function may, when the set node route information, the bandwidth resource information, and the maximum delay time information from all of the controller service control functions are satisfied for provision of the requested ultra-precision service, transmit an actual ultra-precision service provision request to all of the controller service control functions. Upon receiving the actual ultra-precision service request, the controller service control function may transmit a ultra-precision service delivery information setting request, which includes an ultra-precision service packet delivery time received as a response to a request that the controller ultra-precision service packet delivery time processing function should calculate an in-time packet delivery time or an on-time packet delivery time depending on the type of ultra-precision service, the set node route information, and the secured bandwidth resource information to the network node control agent.

The network node control agent function may set the set node route information, the bandwidth resource information, and the ultra-precision service packet delivery time information, which are pieces of ultra-precision service delivery information received from the controller service control function, in each network node.

In addition, the network node control agent function may provide network node and link information requested by the controller topology information configuration function for configuration of controller topology information.

FIGS. 3A to 3F are flowcharts for an execution process of a centralized ultra-precision network control framework system controlling heterogeneous multiple network domains according to various embodiments of the present disclosure.

Referring to FIGS. 3A to 3F, in order that the centralized ultra-precision network control framework system for controlling heterogeneous multiple network domains is executed, first, there is need to perform a controller topology information configuration, which is a topological configuration of network nodes that deliver an ultra-precision service packet, and a configuration of orchestrator topology information configured with a domain including only boundary nodes.

Therefore, the network node control agent function located in each network node may transmit node information of a node, to which the network node control agent function belongs, link information of the node, and node and link information of a node connected adjacent to the node to the controller topology information configuration function located in the network domain controller (1).

The controller topology information configuration function may receive the node information, the link information, and the adjacent node and link information from the network node control agent function of each of the network nodes (2).

The controller topology information configuration function may configure controller topology information based on the received node information, the received link information, and the received adjacent node and link information (3).

The controller topology information configuration function may extract only ingress nodes and egress nodes corresponding to the boundary among nodes constituting a domain from the configured controller topology information (4)

The controller topology information configuration function may transmit boundary node information, boundary node link information, adjacent domain node information, and adjacent domain node link information to the orchestrator topology information configuration function located in the ultra-precision network orchestrator (5).

The orchestrator topology information configuration function may receive the boundary node information, the boundary node link information, the adjacent domain node information, and the adjacent domain node link information from the controller topology information configuration function (6).

The orchestrator topology information configuration function may configure orchestrator topology information based on the received boundary node information, boundary node link information, adjacent domain node information, and adjacent domain node link information (7).

When the controller topology information configuration and the orchestrator topology information configuration for providing ultra-precision services are completed, the centralized ultra-precision network control framework system controlling heterogeneous multiple network domains may form an environment capable of accepting an ultra-precision service start request from an ultra-precision service terminal, which is a user system.

Figure 3A:
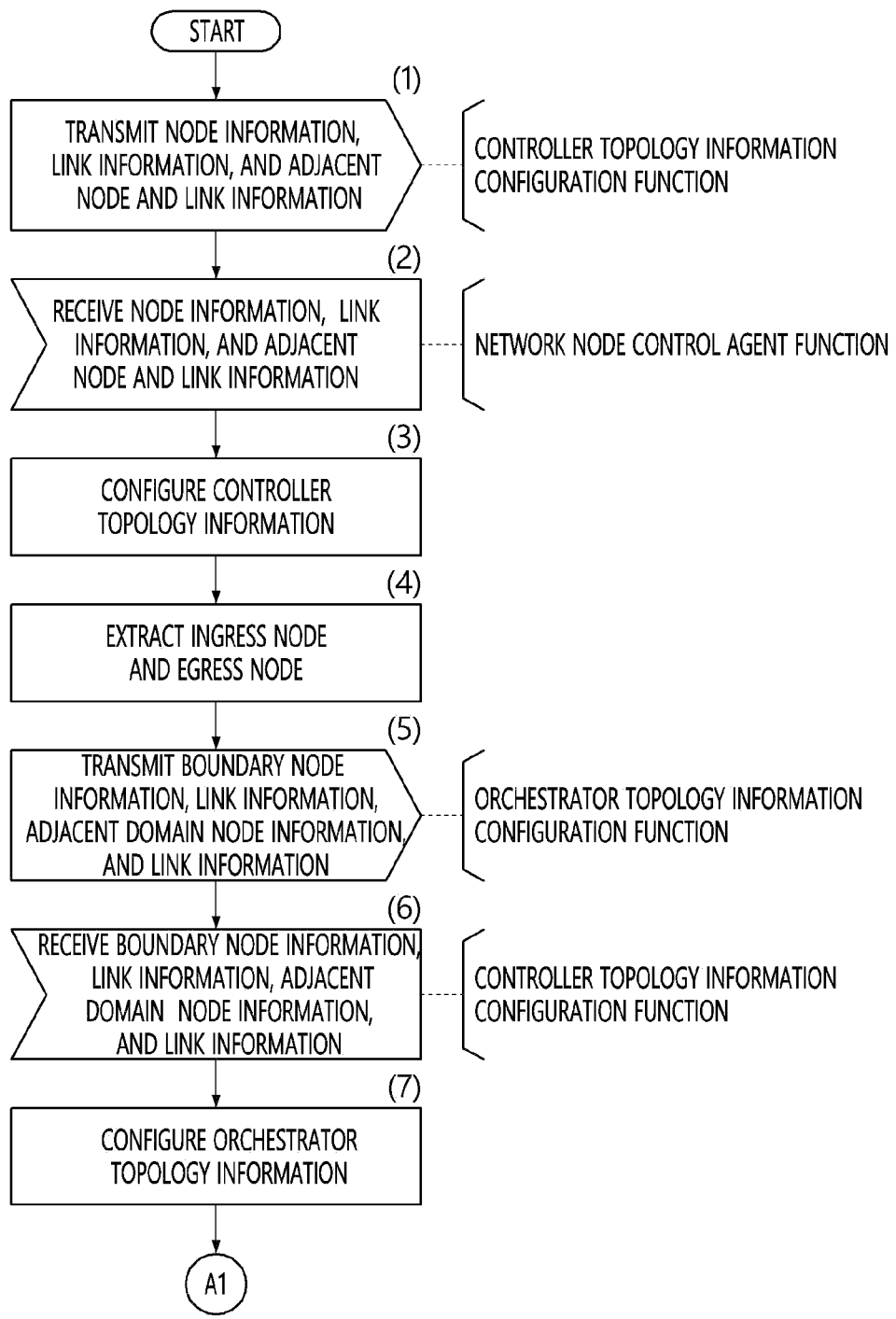
FIGS. 3A to 3F are flowcharts for an execution process of a centralized ultra-precision network control framework system controlling heterogeneous multiple network domains according to various embodiments of the present disclosure.
Figure 3B:
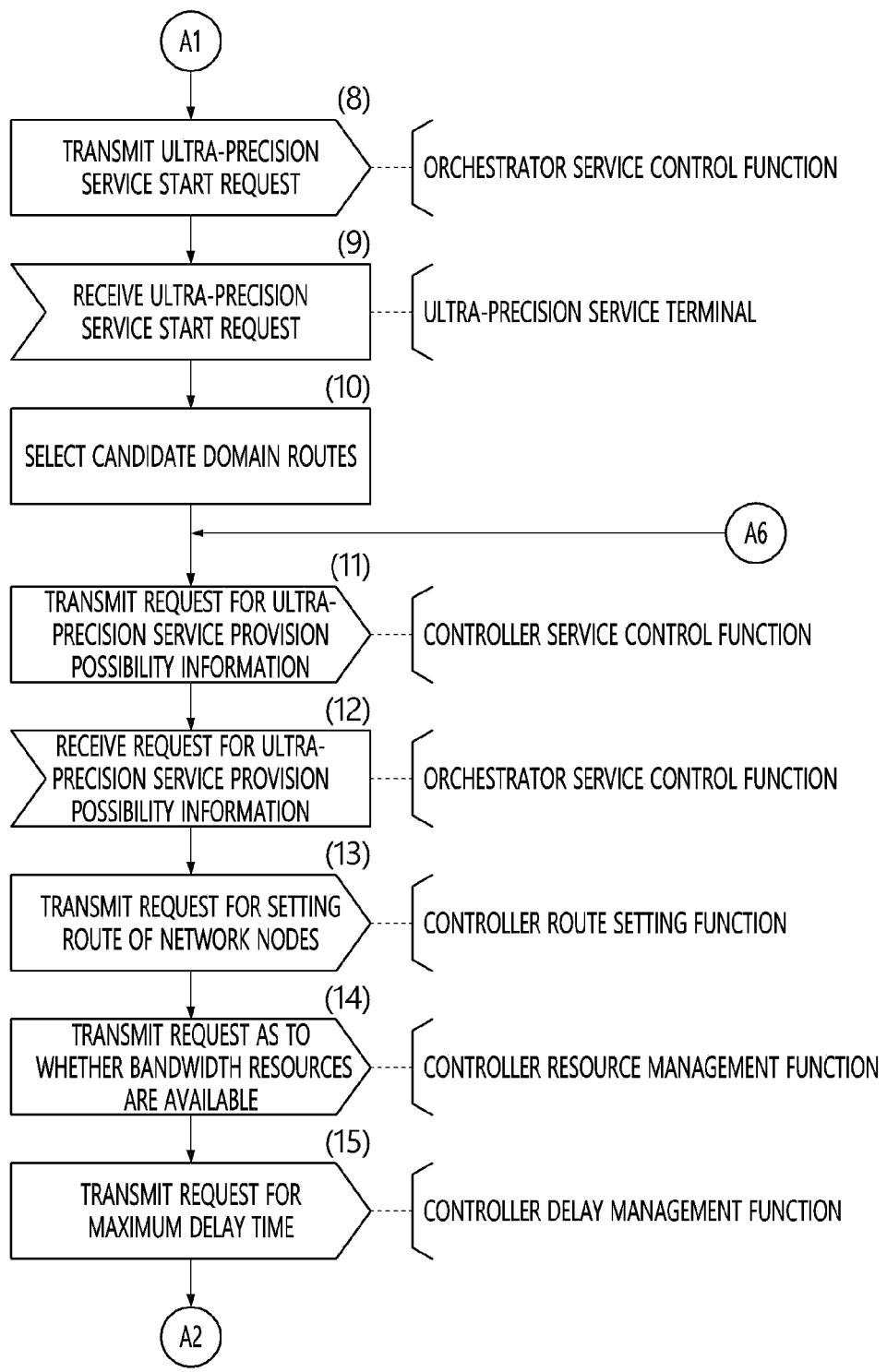
Figure 3C:
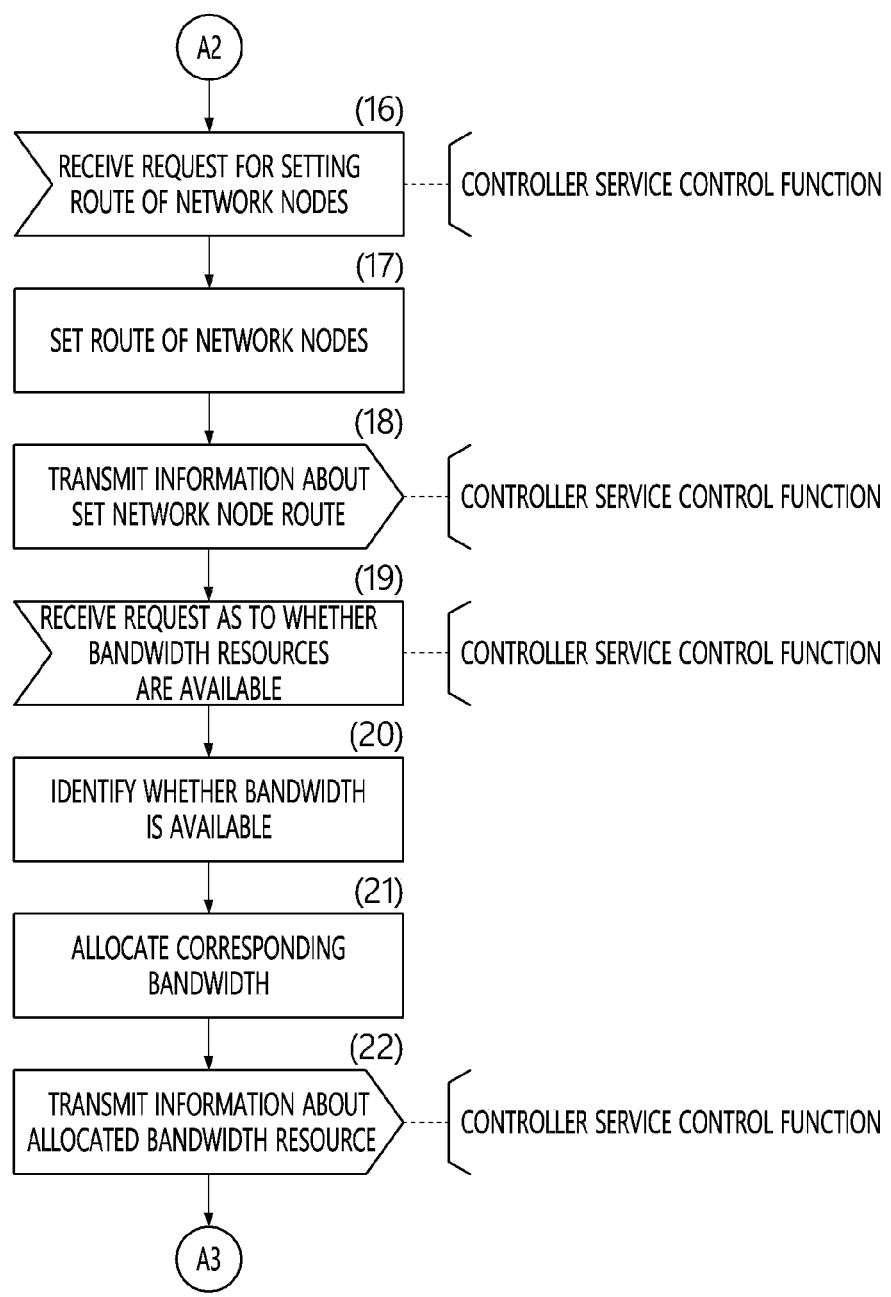
Figure 3D:
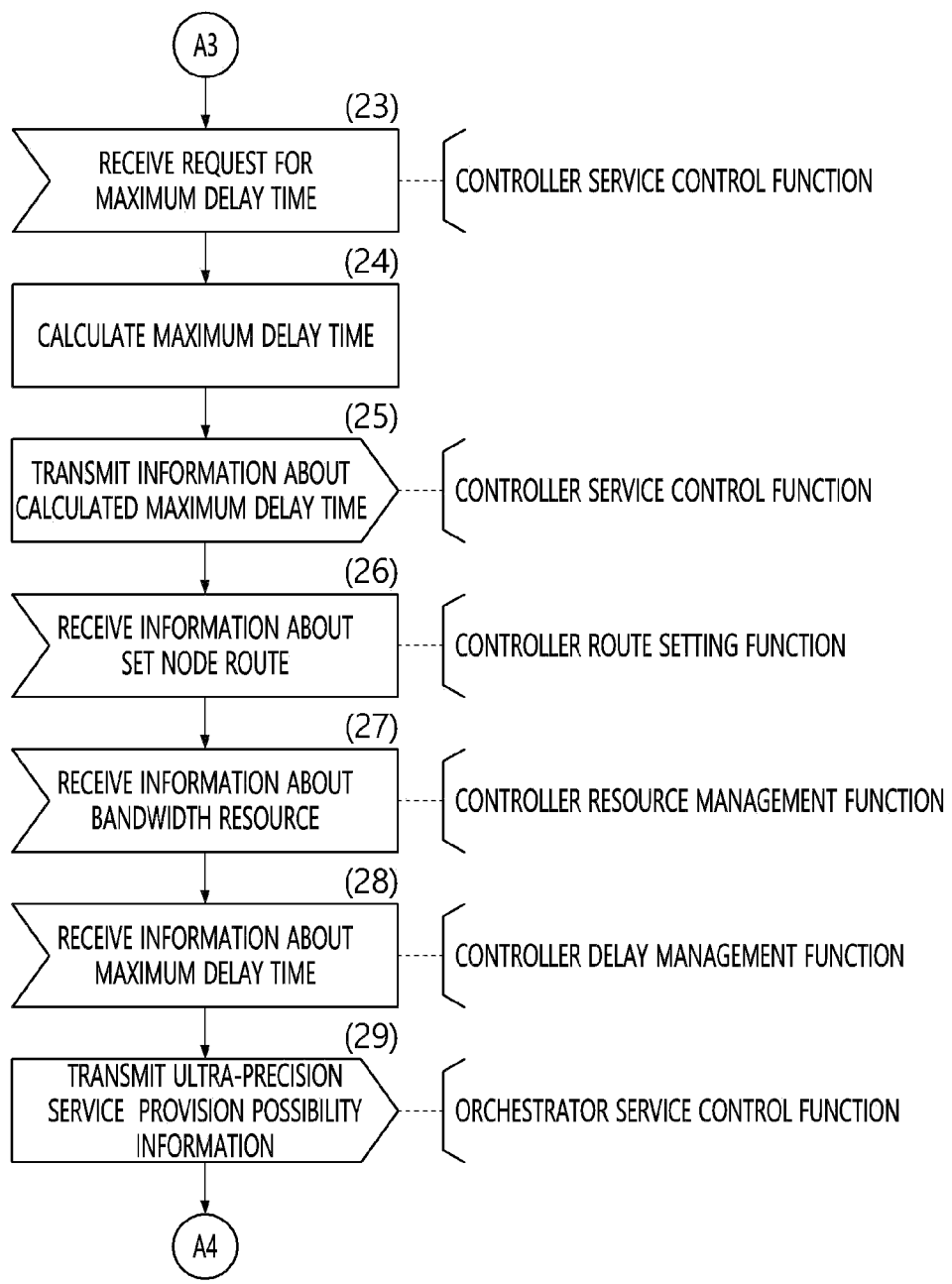
Figure 3E:
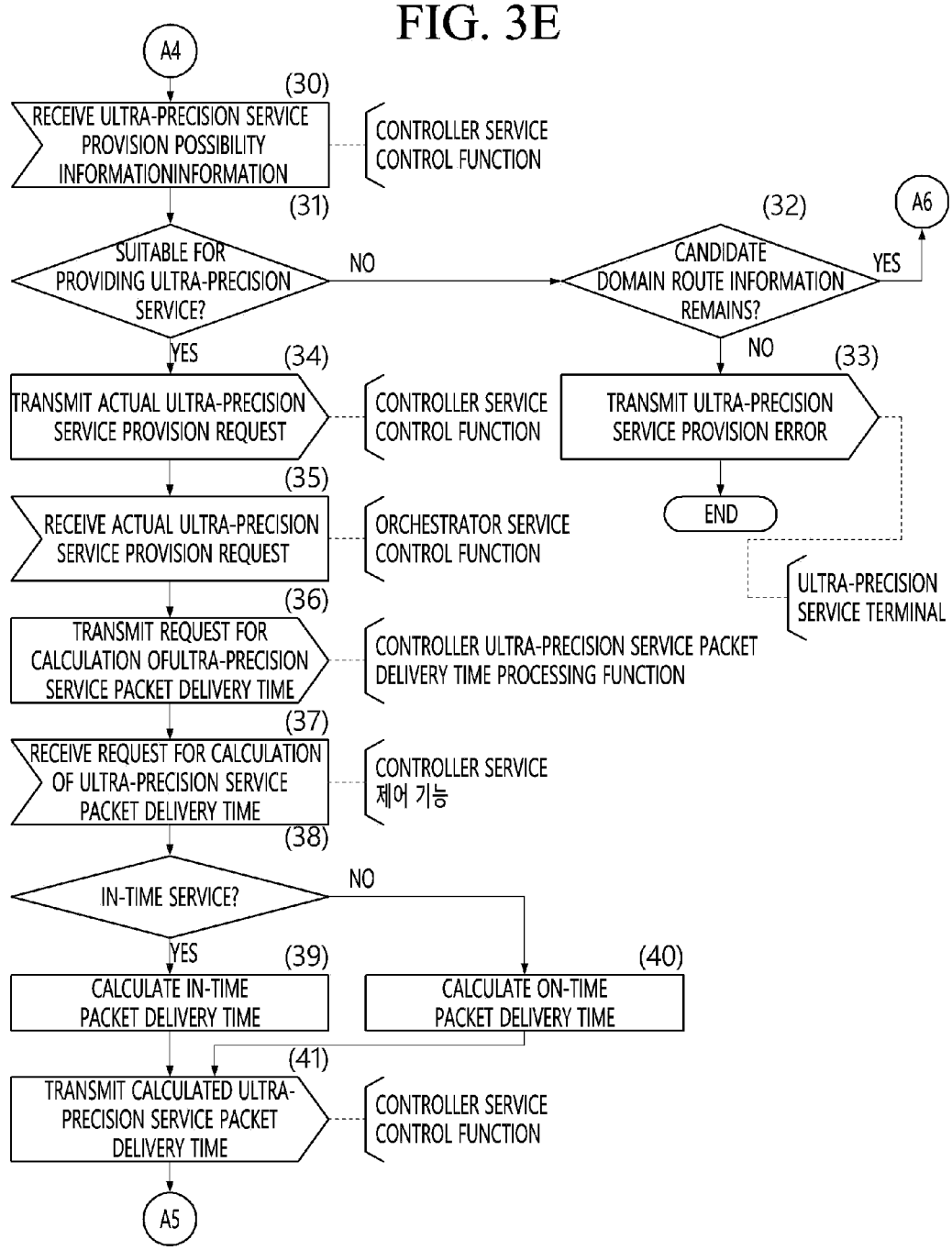
Figure 3F:
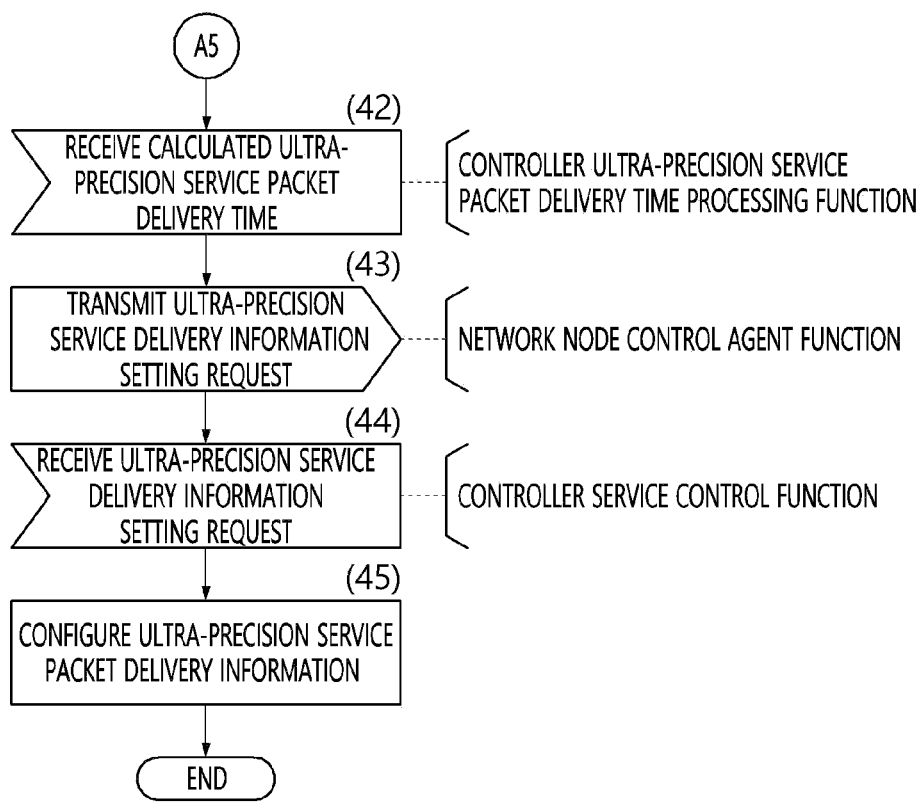

Referring to FIG. 3B, an ultra-precision service terminal may transmit an ultra-precision service start request to the orchestrator service control function (8). The orchestrator service control function may receive the ultra-precision service start request of the terminal (9).

The orchestrator service control function may first select candidate domain routes based on the orchestrator topology information configured to set a route in which provision of the ultra-precision service is possible (10).

In order to identify whether provision of the ultra-precision service is possible, the orchestrator service control function may, together with information on one selected candidate domain route, transmit a request for ultra-precision service provision possibility information, such as bandwidth resource information required for the ultra-precision service and a maximum delay time of the domain route, to the controller service control function of each of the network domain controllers constituting the heterogeneous multiple network domains (11).

The controller service control function may receive the request for the ultra-precision service provision possibility information from the orchestrator service control function (12).

The controller service control function may request the controller route setting function to set a route of network nodes based on the selected candidate domain route information (13).

The controller service control function may make a request to the controller resource management function as to whether bandwidth resources for the requested ultra-precision service are available (14).

The controller service control function may request the controller delay management function for the maximum delay time of the corresponding network domain (15).

The controller route setting function may receive the candidate domain route information from the controller service control function (16).

The controller route setting function may, based on the received candidate domain route information, set a route of network nodes that may be constructed based on an ingress node, which is a network node connected in a direction from a terminal of a boundary node of the domain toward a network node, and an egress node, which is a network node connected in a direction from a network node toward a terminal, as a reference axis (17).

The controller route setting function may transmit the set route information of network nodes to the controller service control function (18).

The controller resource management function may receive the request as to whether bandwidth resources are available for the ultra-precision service from the controller service control function (19).

The controller resource management function may identify whether bandwidth setting on the node route set through the controller route setting function is available (20).

The controller resource management function may allocate the bandwidth when the bandwidth setting is available on the set node route (21).

The controller resource management function may transmit information about the allocated bandwidth resource to the controller service control function (22).

The controller delay management function may receive the request for the maximum delay time of the network domain from the controller service control function (23).

The controller delay management function may, in order to calculate the maximum delay time on the node route set through the controller route setting function, identify and calculate a node maximum delay time and a link maximum delay time (24).

The controller delay management function may transmit the calculated maximum delay time information of the network domain to the controller service control function (25).

The controller service control function may receive the node route information set from the controller route setting function as a response (26).

The controller service control function may receive the bandwidth resource information from the controller resource management function as a response (27).

The controller service control function may receive the maximum delay time information from the controller delay management function as a response (28).

The controller service control function may transmit the ultra-precision service provision possibility information including the maximum delay time information to the orchestrator service control function (29).

The orchestrator service control function may receive the ultra-precision service provision possibility information including the set node route information, the bandwidth resource information, and the maximum delay time information from all of the controller service control functions (30).

The orchestrator service control function may determine whether the ultra-precision service provision possibility information received from all of the controller service control functions is suitable for providing the requested ultra-precision service (31).

The orchestrator service control function may, when the ultra-precision service provision possibility information is not suitable for providing the requested ultra-precision service, check whether the next candidate domain route information remains (32).

When the next candidate domain route information remains, the orchestrator service control function may transmit, together with the candidate domain route information, a request for ultra-precision service provision possibility information, such as bandwidth resource information required for the ultra-precision service and a maximum delay time of the domain route, to the controller service control function of each of the network domain controllers in a repeated manner.

The orchestrator service control function may repeat the process until the ultra-precision service provision possibility information, including the set node route information, the bandwidth resource information, and the maximum delay time information received from all of the controller service control functions, are suitable for providing the ultra-precision service.

When there is no remaining candidate domain route information, the orchestrator service control function may transmit an ultra-precision service provision error to the ultra-precision service terminal because the provision of the ultra-precision service is not possible (33).

However, the orchestrator service control function may, when the ultra-precision service provision possibility information received from all of the controller service control functions is suitable for providing the requested ultra-precision service in operation 31, transmit an actual ultra-precision service provision request to all of the controller service control functions (34).

The controller service control function may receive the actual ultra-precision service provision request (35).

The controller service control function may request the controller ultra-precision service packet delivery time processing function to calculate a ultra-precision service packet delivery time (36).

The controller ultra-precision service packet delivery time processing function may receive a request for calculating the ultra-precision service packet delivery time from the controller service control function (37).

The controller ultra-precision service packet delivery time processing function may identify whether the ultra-precision service is an in-time service or an on-time service (38).

The controller ultra-precision service packet delivery time processing function may identify whether the ultra-precision service is an in-time service or an on-time service, and in the case of an in-time service in operation 38, calculate an in-time packet delivery time for processing an in-time packet of a network node, which includes a local delay time of the network node and an in-time allowable delay time (39).

In the case of an on-time service rather than an in-time service in operation 38, the controller ultra-precision service packet delivery time processing function may calculate an on-time packet delivery time for processing an on-time packet of a network node, which includes a local delay time of the network node, a buffering delay time for which the packet is forced to stay before being transmitted to the next network node, and an allowable variation in delay time of on-time packet delivery (40).

The controller ultra-precision service packet delivery time processing function may transmit the calculated ultra-precision service packet delivery time to the controller service control function (41).

The controller service control function may receive the ultra-precision service packet delivery time calculated from the controller ultra-precision service packet delivery time processing function (42).

The controller service control function may transmit an ultra-precision service delivery information setting request including the calculated ultra-precision service packet delivery time, the set node route information, and the secured bandwidth resource information to the network node control agent function (43).

The network node control agent function may receive the ultra-precision service delivery information setting request from the controller service control function (44).

The network node control agent function may set the set node route information, the bandwidth resource information, and the ultra-precision service packet delivery time information in each network node to configure ultra-precision service packet delivery information (45).

The network node control agent may transmit an ultra-precision service packet received by the network node to a lower network node using the ultra-precision service packet delivery information.

Figure 4:
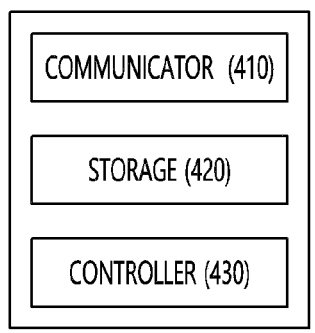
FIG. 4 illustrates a block diagram of a network orchestrator, a network domain controller, and a network node control agent in a communication system according to various embodiments of the present disclosure.

FIG. 4 illustrates a block diagram of a network orchestrator, a network domain controller, and a network node control agent in a communication system according to various embodiments of the present disclosure. Components illustrated in FIG. 4 may be understood as components of the network orchestrator, the network domain controller, and the network node control agent. The term "unit" or "device" used in the following description may be a unit that processes one or more functions or operations and may be implemented as hardware or software or a combination of hardware and software.

Referring to FIG. 4, the terminal may include a communicator 410, a storage 420, and a controller 430.

The communicator 410 may perform functions for transmitting and receiving signals through wired and wireless channels. For example, the communicator 410 may include a transmission filter, a reception filter, an amplifier, a mixer, an oscillator, a digital-analog converter (DAC), an analog-digital converter (ADC), and the like.

In addition, the communicator 410 may include a plurality of transmission/reception paths. In terms of hardware, the communicator 410 may include a digital circuit and an analog circuit (e.g., a radio frequency integrated circuit (RFIC)). Here, the digital circuit and the analog circuit may be implemented in one package. In addition, the communicator 410 may include multiple RF chains. The communicator 410 transmits and receives signals as described above.

Accordingly, all or part of the communicator 410 may be referred to as a "transmitter," a "receiver," or a "transceiver." In addition, in the following description, transmission and reception performed through a wireless channel may be used to mean that the above-described processing is performed by the communicator 410.

The storage 420 may store data, such as a basic program, an application program, and setting information for operating the terminal. The storage 420 may include a volatile memory, a non-volatile memory, or a combination of volatile and non-volatile memories. In addition, the storage 420 may provide stored data according to a request of the controller 430.

The controller 430 may control overall operations of the terminal. For example, the controller 430 may transmit and receive signals through the communicator 410. In addition, the controller 430 may write or read data to or from the storage 420. The controller 430 may perform functions of a protocol stack required by communication standards. To this end, the controller 430 may include at least one processor or microprocessor, or may be a part of a processor.

According to various embodiments, the controller 430 may control the network orchestrator, the network domain controller, and the network node control agents shown in FIGS. 3A to 3F to perform the operations.

According to various embodiments of the present disclosure, a centralized ultra-precision network control framework system capable of providing a DetNet-based ultra-precision service in order to provide an ultra-precision service in a large-scale deterministic network composed of heterogeneous multiple network domains may be provided.

According to an embodiment, there may be provided separate network domain controllers that use an ultra-precise network orchestrator in order to control heterogeneous multiple network domains for expansion of a time-deterministic network infrastructure, and respectively manage network domains.

According to an embodiment, the centralized high-precision network control framework system may include a ultra-precision network orchestrator, a network domain controller, and a network node control agent.

According to an embodiment, the ultra-precise network orchestrator may include an orchestrator topology information configuration function, an orchestrator route setting function, and an orchestrator service control function.

According to an embodiment, the network domain controller may include a controller topology information configuration function, a controller route setting function, a controller resource management function, a controller delay management function, a controller ultra-precision service packet delivery time processing function, and a controller service control function.

According to an embodiment, the orchestrator topology information configuration may provide a network topology view which is abstracted such that only network nodes located at a boundary of a network domain are viewed and thus content within the network domain are not recognized, thereby preventing the sharing of information about the content within a network domain for scalability and confidentiality.

According to an embodiment, the controller topology information configuration may provide a network node topology view such that all network nodes within a corresponding network domain may be viewed and controlled.

According to an embodiment, whether provision of an ultra-precision service is possible, which is requested by the ultra-precise network orchestrator, may be requested to each of the network domain controllers included in the domain route, and ultra-precision service provision possibility information including set node route information, bandwidth resource information, and maximum delay information may be received from each of the network domain controllers as a response, and when all of the received ultra-precision service provision possibility information is suitable for provision of the ultra-precision service, actual provision of the ultra-precision service may be requested.

According to an embodiment, the ultra-precision service provision possibility information including the set node route information, the bandwidth resource information, and the maximum delay time information received by each of the network domain controllers may not be suitable, and in this case, with the next candidate domain route information, it may be requested to each of the network domain controllers included in the domain route whether provision of the ultra-precision service requested by the ultra-precision network orchestrator is possible, in a repeated manner until the provision of the ultra-precision service is determined to possible from all of the network domain controllers.

According to an embodiment, the network domain controller may, upon a request for ultra-precision service provision possibility information being received from the ultra-network orchestrator, request the controller route setting function to set a route of network nodes based on the set domain route information, make a request to the controller resource management function as to whether bandwidth resources for the requested ultra-precision service are available, and request the controller delay management function for the maximum delay of the corresponding network domain.

According to an embodiment, the network domain controller may, upon receiving an actual ultra-precision service provision request from the ultra-precision network orchestrator, request the controller ultra-precision service packet delivery time processing function to calculate an ultra-precision service packet delivery time for an in-time service or an on-time service.

Methods according to the claims of the present disclosure or the embodiments described in the specification may be implemented in hardware, software, or a combination of hardware and software.

When implemented in software, a computer-readable storage medium for storing one or more programs (software modules) may be provided. One or more programs stored in a computer-readable storage medium are configured for execution by one or more processors in an electronic device. The one or more programs include instructions that cause the electronic device to perform the methods in accordance with the claims of the present disclosure or the embodiments described in the specification.

Such programs (software modules, software) may be stored in a random access memory, a non-volatile memory including a flash memory, a read only memory (ROM), an electrically erasable programmable read only memory (EE-PROM), a magnetic disk storage device, a compact disc-ROM (CD-ROM), a digital versatile disc (DVD), or other types of optical storage devices, or a magnetic cassette. Alternatively, the programs may be stored in a memory composed of a combination of some or all thereof. In addition, each configuration memory may be included in plurality.

In addition, the programs may also be stored on attachable storage devices that may be accessed through communication networks, such as the Internet, an intranet, a local area network (LAN), a WAN, or a storage area network (SAN), or a communication network composed of a combination of the communication networks. Such a storage device may be connected to a device performing an embodiment of the present disclosure through an external port. In addition, a separate storage device on a communication network may be connected to a device performing an embodiment of the present disclosure.

In the specific embodiments of the present disclosure described above, components included in the disclosure are expressed in a singular or plural form according to the specific embodiments presented. However, the singular or plural expression is appropriately selected for the context presented for convenience of description, and the present disclosure is not limited to the singular or plural component, and even a component expressed in a plural form may be composed of a singular component, and even a component expressed in singular form may be composed of a plurality of components.

As is apparent from the above, the apparatus and method according to various embodiments of the present disclosure can provide a centralized ultra-precision network control framework controlling heterogeneous multiple network domains constituting a large-scale deterministic network by supporting a time-deterministic ultra-precision service without having a distance limitation, in which a large number of devices need to be interconnected to each other and generate data to be stably transmitted to control agents and monitoring agents.

The effects of the present disclosure are not limited to the effects described above, and other effects that are not described will be clearly understood by those skilled in the art from the above detailed description.

Meanwhile, although specific embodiments have been described in the detailed description of the present disclosure, various modifications are possible without departing from the scope of the present disclosure. Therefore, the scope of the present disclosure should not be limited to the described embodiments and should be defined by the claims described below as well as the claims and equivalents

What is claimed is:

1. A method of operating a network domain controller in a communication system, the method comprising:
   receiving node information, link information, adjacent node information, and adjacent node link information from a network node control agent;
   identifying controller topology information based on the node information, the link information, the adjacent node information, and the adjacent node link information; and
   transmitting boundary node information, boundary node link information, adjacent domain node information, and adjacent domain node link information to a network orchestrator,
   wherein the controller topology information comprises:
   complete node configuration and connection information of all network nodes within a network domain; and
   internal node and link information within the network domain, which is not shared with the network orchestrator.

2. The method of claim 1, further comprising receiving a request for ultra-precision service provision possibility information from the network orchestrator.

3. The method of claim 1, further comprising requesting setting of a route of network nodes based on candidate domain route information.

4. The method of claim 1, further comprising:
   identifying whether bandwidth resources for an ultra-precision service are available;
   requesting a maximum delay time of the network domain; and
   identifying candidate domain route information.

5. The method of claim 1, further comprising, based on candidate domain route information, identifying a route of network nodes that is configured based on an ingress node, which is a network node connected in a direction from a terminal of a boundary node of the network domain toward a network node and an egress node, which is a network node connected in a direction from a network node toward a terminal of a boundary node, as a reference axis.

6. The method of claim 1, further comprising:
identifying whether bandwidth setting on a node route is available; and
when the bandwidth setting on the node route is available, allocating the bandwidth.

7. The method of claim 1, further comprising transmitting ultra-precision service provision possibility information including maximum delay time information to the network orchestrator.

8. The method of claim 1, further comprising requesting the network node control agent to set ultra-precision service delivery information including an ultra-precision service packet delivery time, node route information, and bandwidth resource information.

9. A method of operating a network orchestrator in a communication system, the method comprising:
receiving boundary node information, boundary node link information, adjacent domain node information, and adjacent domain node link information from a network domain controller; and
generating orchestrator topology information based on the boundary node information, the boundary node link information, the adjacent domain node information, and the adjacent domain node link information,
wherein the orchestrator topology information comprises only boundary node-related information of each domain, while excluding internal topology information of each domain.

10. The method of claim 9, further comprising:
receiving an ultra-precision service start request from a terminal; and
identifying candidate domain routes based on the orchestrator topology information.

11. The method of claim 9, further comprising requesting the network domain controller for bandwidth resource information and information about a maximum delay time of a domain route.

12. The method of claim 9, further comprising receiving ultra-precision service provision possibility information including node route information, bandwidth resource information, and maximum delay time information from the network domain controller.

13. The method of claim 12, further comprising identifying whether the ultra-precision service provision possibility information is suitable for providing an ultra-precision service.

14. The method of claim 13, further comprising, when the ultra-precision service provision possibility information is not suitable for providing the ultra-precision service, identifying whether next candidate domain route information remains.

15. The method of claim 14, further comprising, when the next candidate domain route information remains, requesting the network domain controller for bandwidth resource information required for the ultra-precision service and information about a maximum delay time of the domain route.

16. The method of claim 14, further comprising, when the next candidate domain route information does not remain, transmitting information about an ultra-precision service provision error to a terminal.

17. An apparatus for a network domain controller in a communication system, the apparatus comprising:
a transceiver; and
a controller operatively connected to the transceiver,
wherein the controller is configured to:
receive node information, link information, adjacent node information, and adjacent node link information from a network node control agent;
identify controller topology information based on the node information, the link information, the adjacent node information, and the adjacent node link information; and
transmit boundary node information, boundary node link information, adjacent domain node information, and adjacent domain node link information to a network orchestrator,
wherein the controller topology information comprises:
complete node configuration and connection information of all network nodes within a network domain; and
internal node and link information within the network domain, which is not shared with the network orchestrator.

18. The apparatus of claim 17, wherein the controller receives a request for ultra-precision service provision possibility information from the network orchestrator.

19. The apparatus of claim 17, wherein the controller requests setting of a route of network nodes based on candidate domain route information.

* * * * *